(12) United States Patent
Schilling et al.

(10) Patent No.: US 10,883,636 B2
(45) Date of Patent: Jan. 5, 2021

(54) FLUID FITTING

(71) Applicant: Eaton Corporation, Cleveland, OH (US)

(72) Inventors: Patrick A. Schilling, Jackson, MI (US); Sumit Joshi, Maharashtra (IN); Mayank Garg, Maharashtra (IN); Srinivasan K. Raghavendra, Karnataka (IN); Sergey S. Kotcharov, Okemos, MI (US); Lee Fausneaucht, Jackson, MI (US); Joe Natter, Jackson, MI (US); Ravi Soni, Okemos, MI (US); Devashish R. Murkya, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 165 days.

(21) Appl. No.: 15/737,005

(22) PCT Filed: Jun. 16, 2016

(86) PCT No.: PCT/US2016/037889
§ 371 (c)(1),
(2) Date: Dec. 15, 2017

(87) PCT Pub. No.: WO2016/205529
PCT Pub. Date: Dec. 22, 2016

(65) Prior Publication Data
US 2018/0372251 A1    Dec. 27, 2018

Related U.S. Application Data

(60) Provisional application No. 62/180,875, filed on Jun. 17, 2015.

(51) Int. Cl.
*F16L 17/04* (2006.01)
*F16L 33/207* (2006.01)
*F16L 17/00* (2006.01)

(52) U.S. Cl.
CPC ........... *F16L 33/2076* (2013.01); *F16L 17/04* (2013.01); *F16L 33/2071* (2013.01);
(Continued)

(58) Field of Classification Search
CPC ....... F16L 33/2076; F16L 17/04; F16L 17/00; F16L 13/141; F16L 33/2071; F16L 33/2078; F16L 33/2073; F16L 13/161
See application file for complete search history.

(56) References Cited

U.S. PATENT DOCUMENTS 6,193,282 B1    2/2001  Assenheimer
2010/0327579 A1  12/2010  Montena
(Continued)

FOREIGN PATENT DOCUMENTS

DE       4329650 A1  *  3/1995
DE   102012010647       * 12/2012
(Continued)

OTHER PUBLICATIONS

International Preliminary Report on Patentability for PCT/US2016/037889, dated Dec. 19, 2017.*
(Continued)

*Primary Examiner* — David Bochna
*Assistant Examiner* — James A Linford
(74) *Attorney, Agent, or Firm* — Fishman Stewart PLLC

(57) ABSTRACT

A fitting (30) for fluid communication with a fluid conduit includes a first fluid conduit connection portion (42), a second fluid conduit connection portion (42'), a header (60) disposed axially between the first fluid conduit connection portion and the second fluid conduit connection portion, and a socket (70). A fluid fitting may include a nipple (40), a radial projection (48) connected to the nipple, and an axial protrusion (120) extending from the radial projection. The axial protrusion may be configured to protrude into an axial end of a fluid conduit (80). A fluid fitting may include a fluid conduit connection portion (42) and a dynamic tip (130)
(Continued)

connected to an end of the fluid conduit connection portion. The dynamic tip may be configured to expand in response to an increase in fluid pressure.

23 Claims, 12 Drawing Sheets

(52) U.S. Cl.
CPC ....... *F16L 33/2073* (2013.01); *F16L 33/2078* (2013.01); *F16L 17/00* (2013.01)

(56) References Cited

U.S. PATENT DOCUMENTS

| | | | |
|---|---|---|---|
| 2012/0167669 A1* | 7/2012 | Raghavendra | G01M 3/047 73/40.5 R |
| 2014/0265561 A1 | 9/2014 | Beining | |

FOREIGN PATENT DOCUMENTS

| | | | | |
|---|---|---|---|---|
| DE | 202013105869 | U1 | | 3/2015 |
| FR | 1335261 | A | * | 8/1963 |
| FR | 1363512 | A | * | 6/1964 |
| FR | 1529663 | A | * | 6/1968 |
| GB | 828912 | A | * | 2/1960 |
| SU | 631739 | A1 | * | 11/1978 |

OTHER PUBLICATIONS

International Search Report, PCT/US2016/037889, dated Sep. 29, 2016.

\* cited by examiner

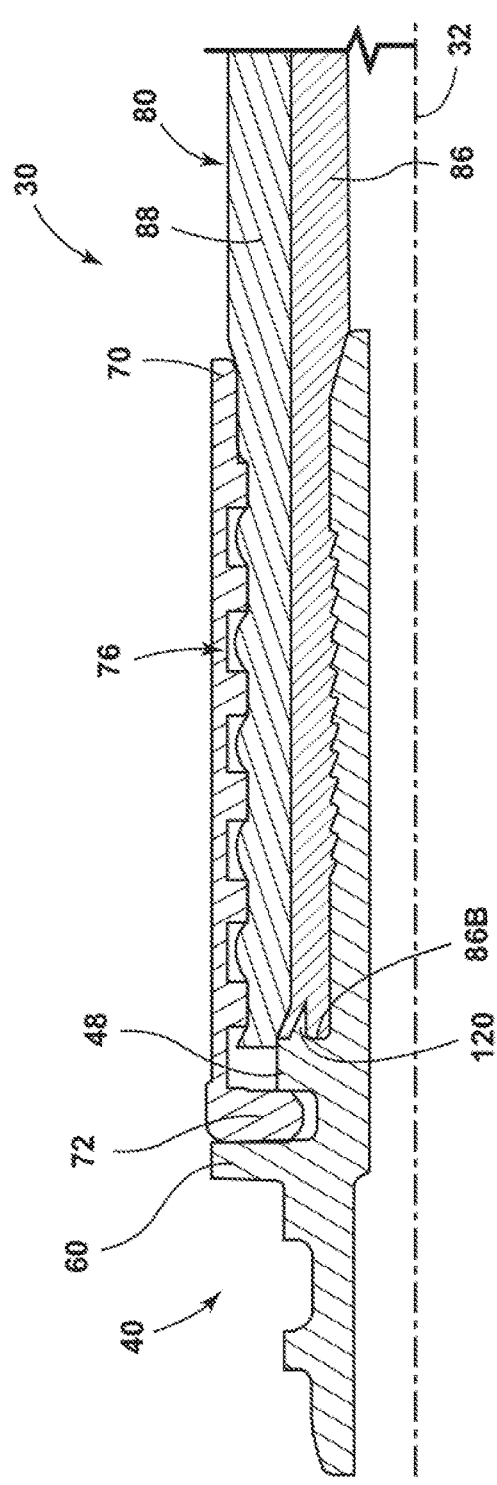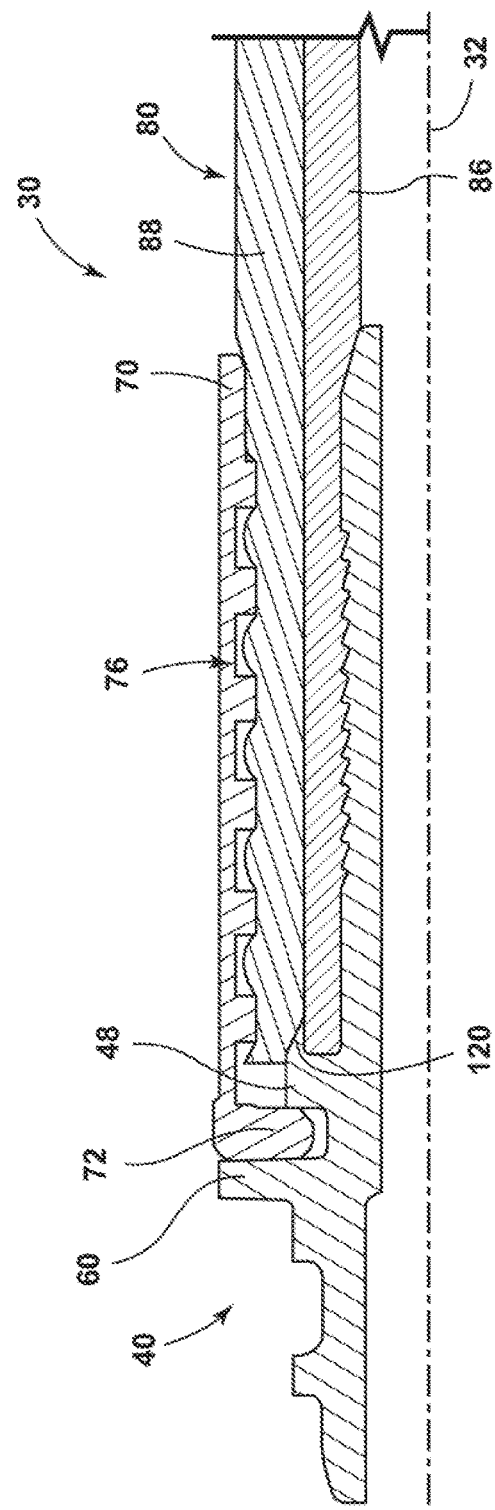

FLUID FITTING

CROSS-REFERENCE TO RELATED APPLICATION

This application is a National Stage Patent Application of International Patent Application No. PCT/US2016/037889, filed Jun. 16, 2016, which claims the benefit of United States Provisional Application Ser. No. 62/180,875, filed Jun. 17, 2015, the contents of both are incorporated by reference in their entireties.

TECHNICAL FIELD

The present disclosure relates to fluid connections, including connections between hoses and nipples.

BACKGROUND

In conventional fluid connections between hoses and nipples, leak paths may be opened over time as the hoses and nipples are exposed to a wide range of pressures and temperatures. In some configurations, the nipples may include a different coefficient of thermal expansion than the hoses (e.g., if the hoses are non-metallic and the nipples are metallic), which, in some instances, could permit the formation of a leak path between the nipple and the hose if the hose expands at a greater rate than the nipple. Conventional leak reduction means, such as O-rings, may not be compatible in certain environments, such as in crimping portions, because O-rings may be damaged by the crimping process.

SUMMARY

In embodiments, a nipple or stem may be metallic and may be attached to a fluid conduit, such as a flexible hose, to connect the flexible conduit to an adjacent component and/or manifold. A nipple may be connected to a fluid conduit via a socket or coupling. The socket may be deformed by crimping, which may permanently attach a fluid conduit to a nipple.

In embodiments, fluid fitting may include a first fluid conduit connection portion, a second fluid conduit connection portion, a header disposed axially between the first fluid conduit connection portion and the second fluid conduit connection portion, and/or a socket. A fluid fitting may include a nipple, a radial projection connected to the nipple, and/or an axial protrusion extending from the radial projection. The axial protrusion may be configured to protrude into an axial end of a fluid conduit. A fluid fitting may include a fluid conduit connection portion and a dynamic tip connected to an end of the fluid conduit connection portion. The dynamic tip may be configured to expand in response to an increase in fluid pressure.

BRIEF DESCRIPTION OF THE DRAWINGS

FIGS. 8A and 8B are cross-sectional views of embodiments of fittings with axial protrusions in accordance with teachings of the present disclosure.

DETAILED DESCRIPTION

Reference will now be made in detail to embodiments of the present disclosure, examples of which are described herein and illustrated in the accompanying drawings. While the disclosure will be described in conjunction with embodiments and/or examples, it will be understood that they are not intended to limit the present disclosure to these embodiments and/or examples. On the contrary, the present disclosure is intended to cover alternatives, modifications, and equivalents, which may be included within the spirit and scope of the present disclosure.

Figure 1:
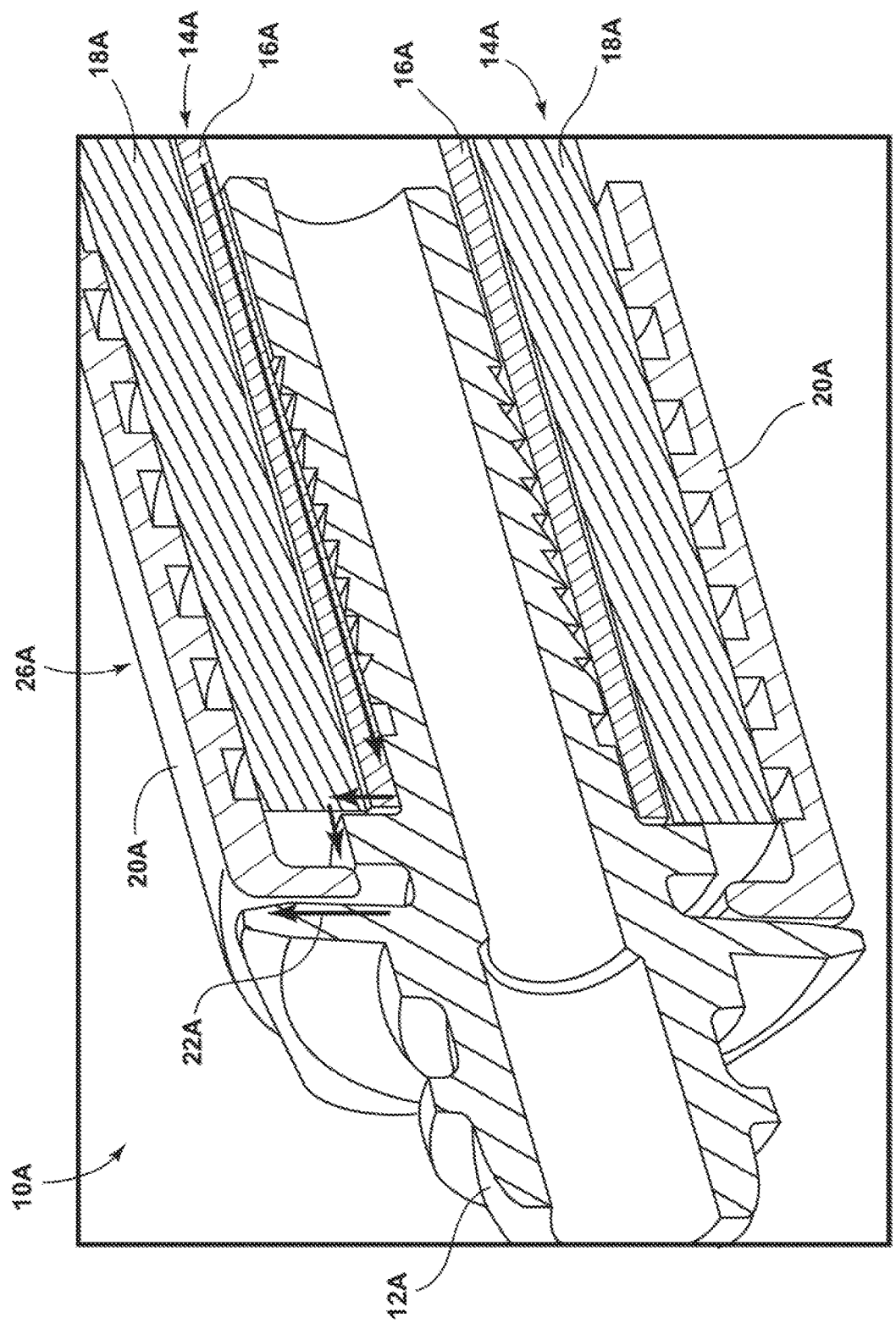
FIG. 1 is a cross-sectional isometric view of an embodiment of a fitting.
Figure 2:
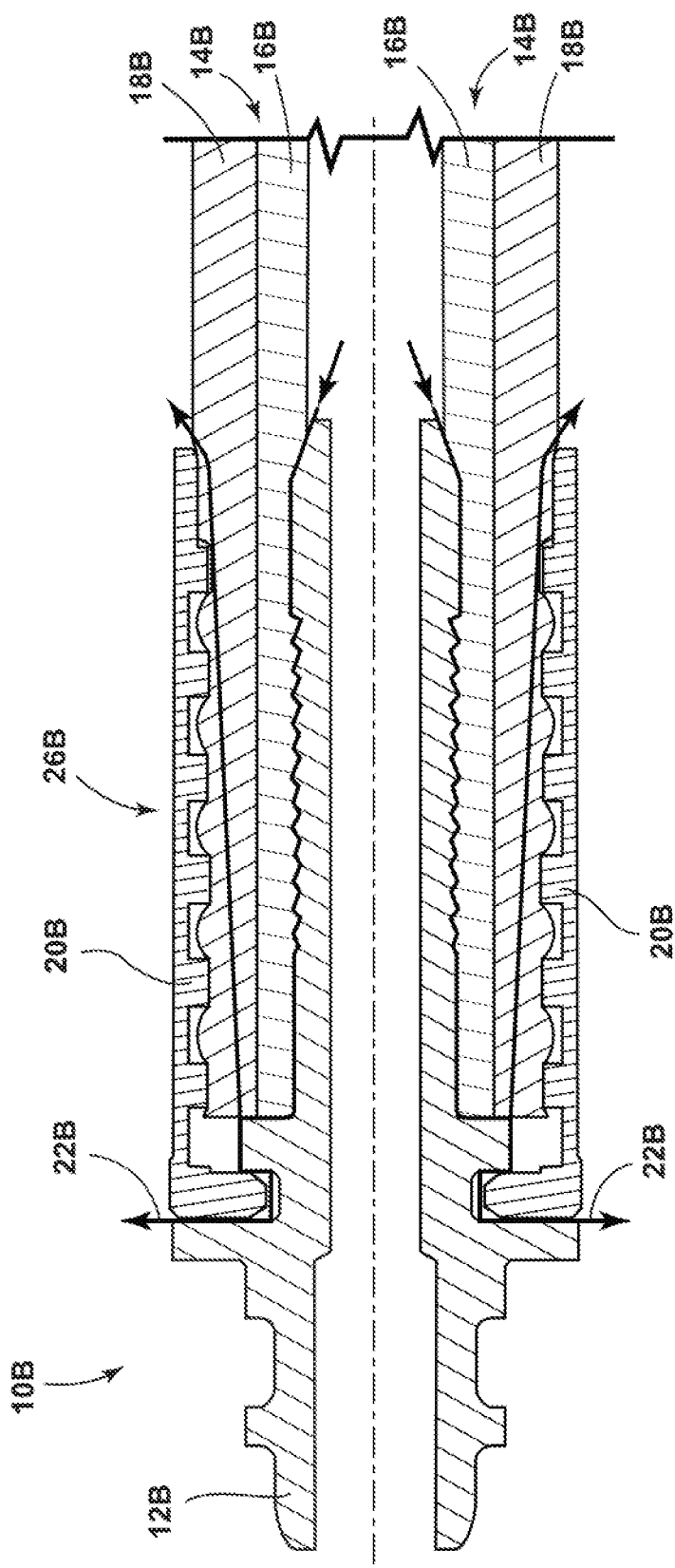
FIGS. 2 and 3 are cross-sectional views of embodiments of fittings.
Figure 3:
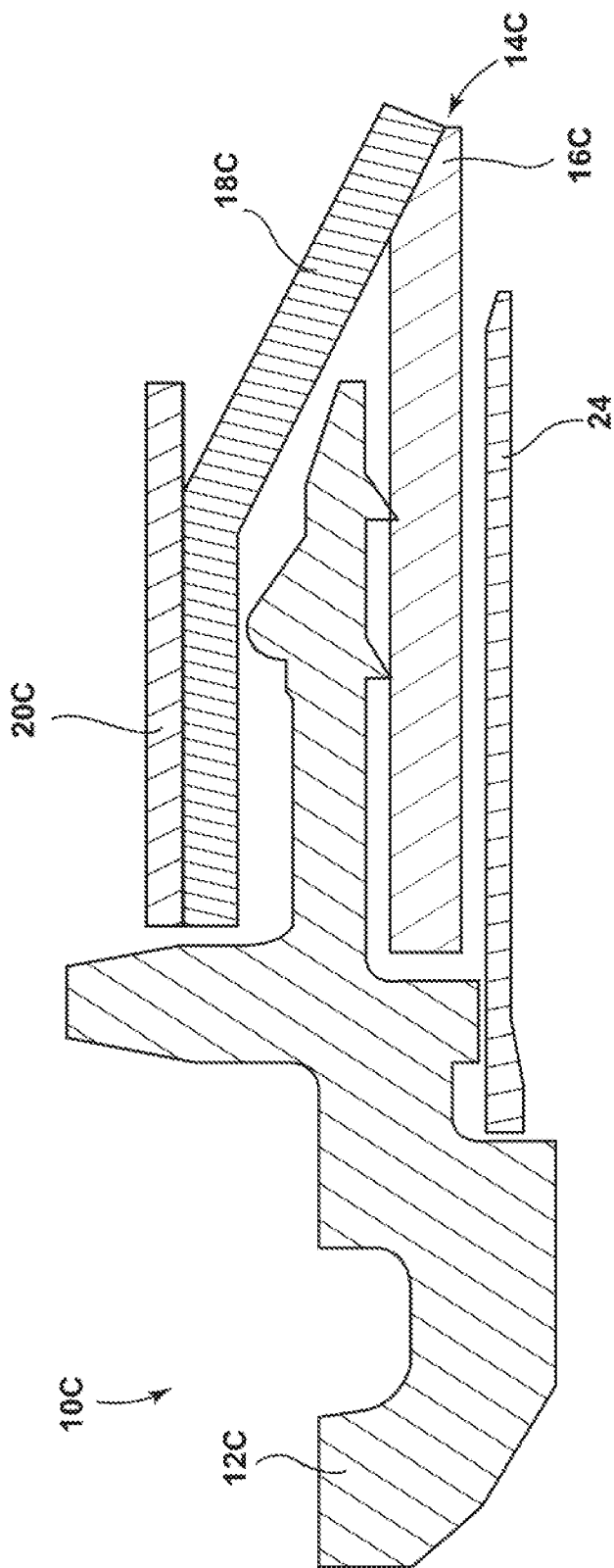

Certain fittings 10A, 10B, such as generally illustrated in FIGS. 1 and 2, may include a nipple 12A, 12B for connecting with a tube 14A, 14B having a core tube 16A, 16B and a tube cover 18A, 18B. A socket 20A, 20B may be disposed around the outside of the nipple 12A, 12B and the tube 14A, 14B. However, certain fittings 10A, 10B may be prone to allowing the formation of leak paths, such as depicted in connection with paths 22A, 22B. For example, and without limitation, fittings 10A, 10B may be subjected to multiple temperature cycles and leak paths 22A, 22B may result from differences in coefficients of thermal expansion and/or a lack of residual force between the tube 14A, 14B and the nipple 12A, 12B. The generation of such leak paths 22A, 22B may be referred to as compression leakage or cool down leakage. The fitting 10C of FIG. 3, which includes a nipple 12C, a rigid metal hose 14C, hose core 16C, a metal braid cover 18C, a socket 20C, and a nipple shank 24, may not typically be viable for non-metallic/textile fluid conduits because textile covers may not be sufficiently stiff and/or may not be easily separated from the core.

Figure 4:
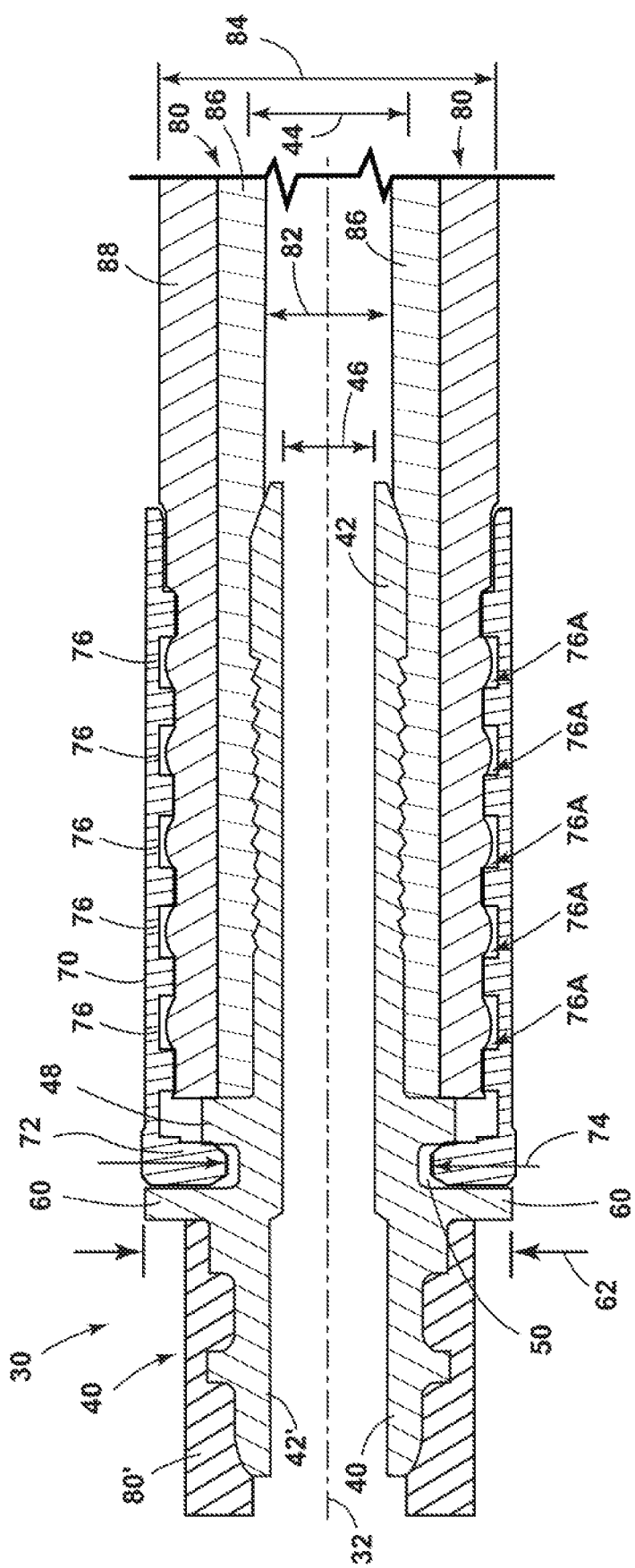
FIG. 4 is a cross-sectional view of an embodiment of a fitting according to teachings of the present disclosure.
Figure 5:
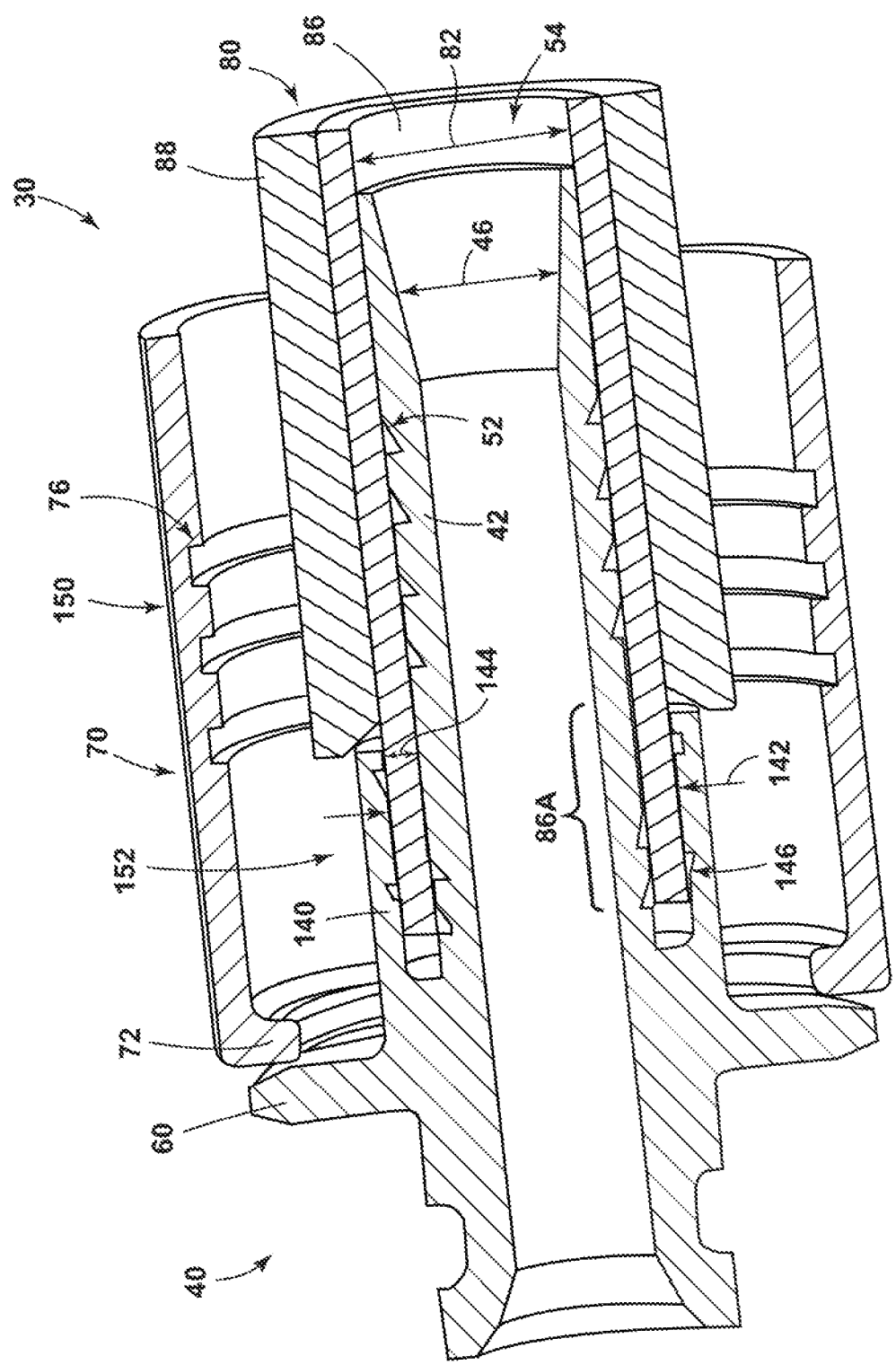
FIG. 5 is a cross-sectional isometric view of an embodiment of a fitting with a sealing sleeve in accordance with teachings of the present disclosure.
Figure 6A:
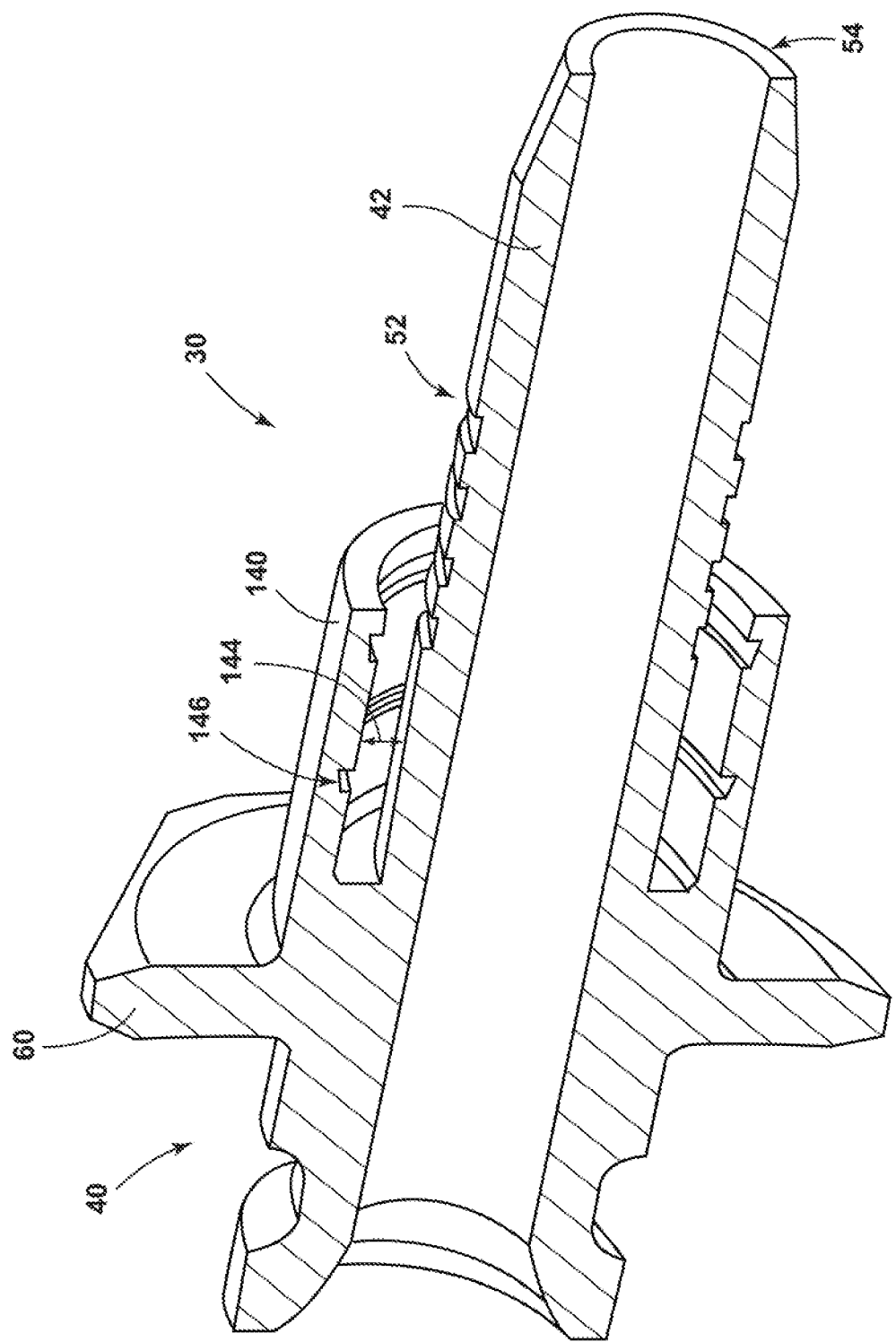
FIGS. 6A-6C are cross-sectional isometric views of embodiments of fittings with sealing sleeves in accordance with teachings of the present disclosure.
Figure 6B:
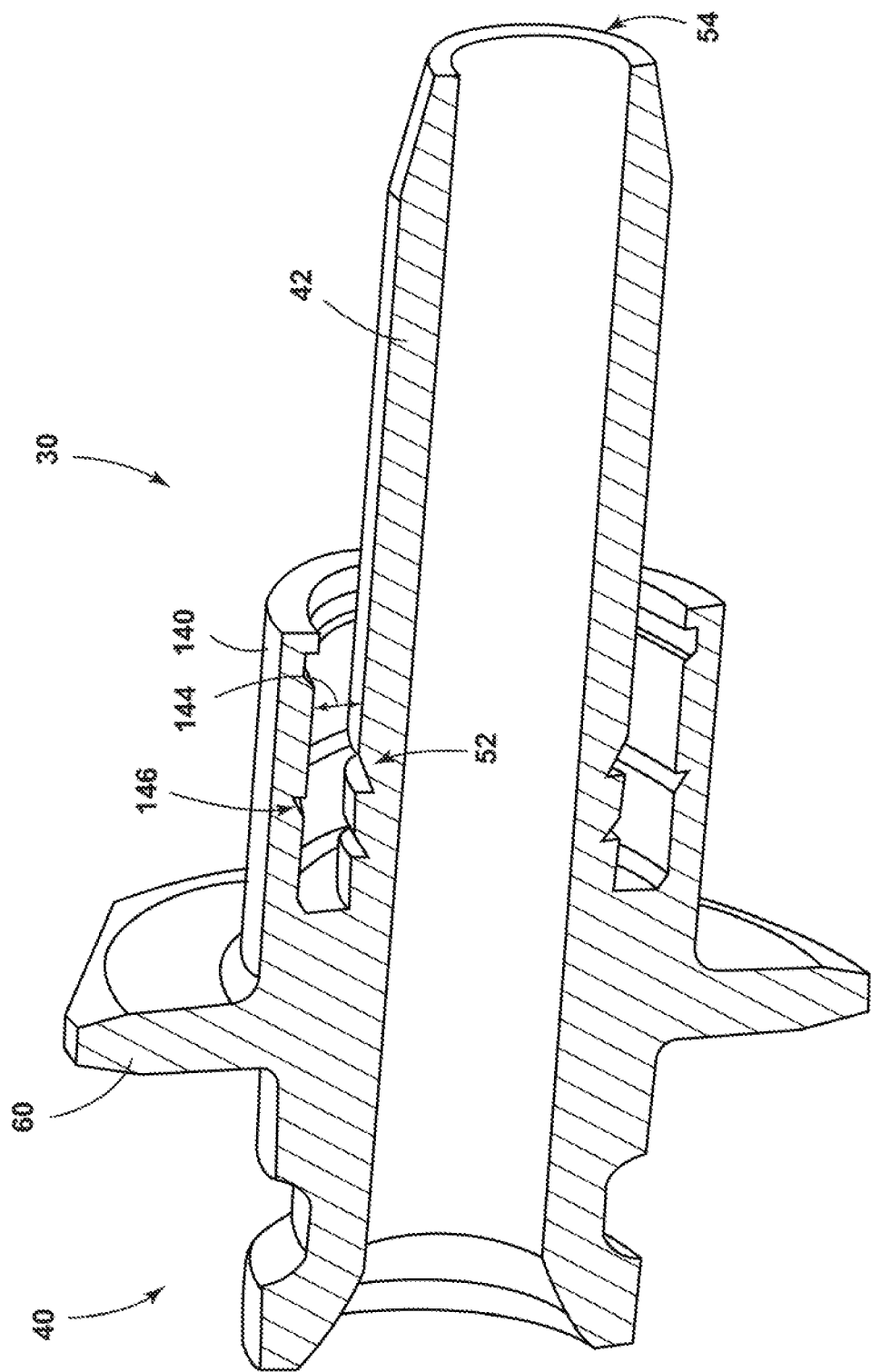
Figure 6C:
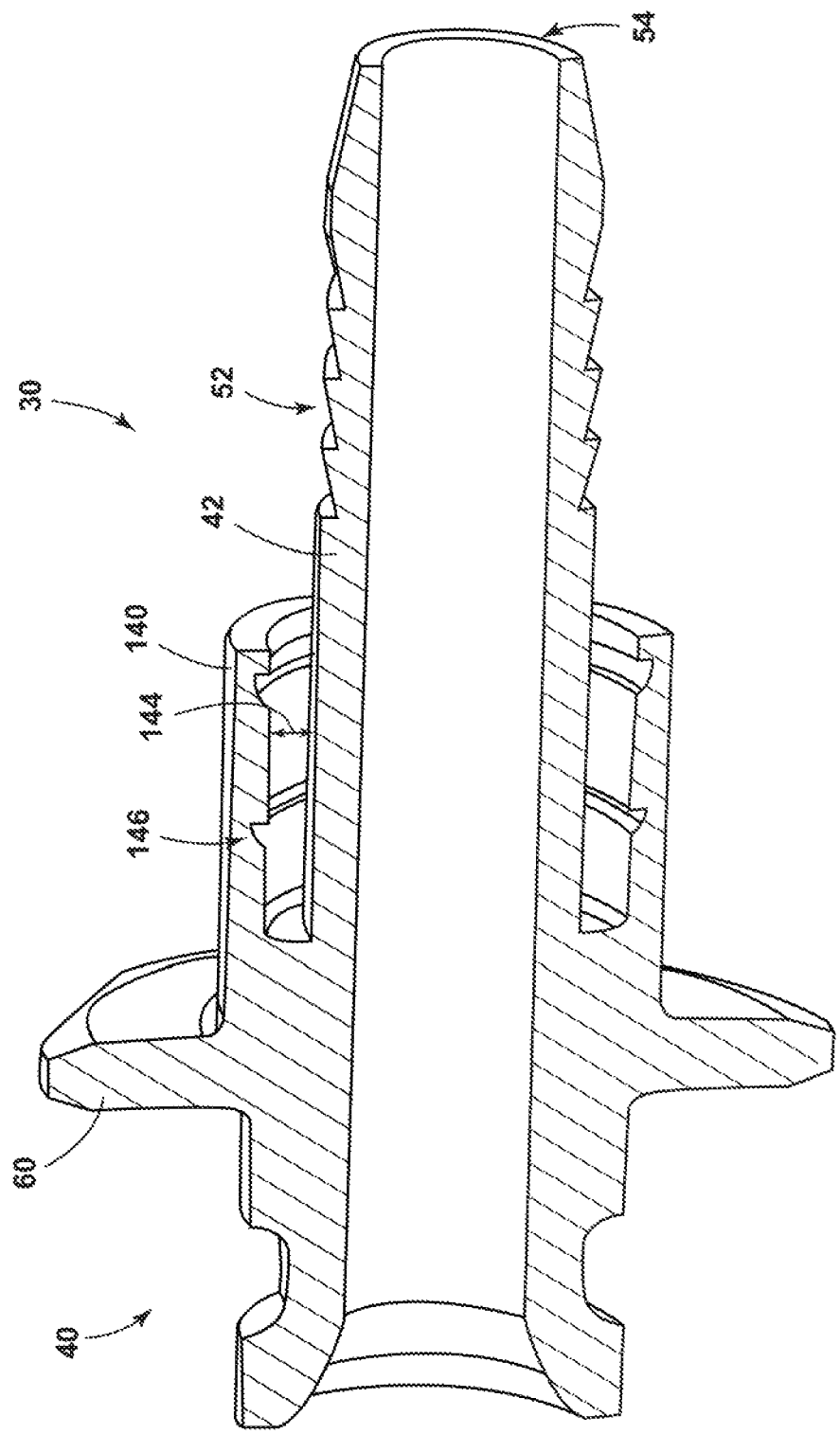
Figure 7:
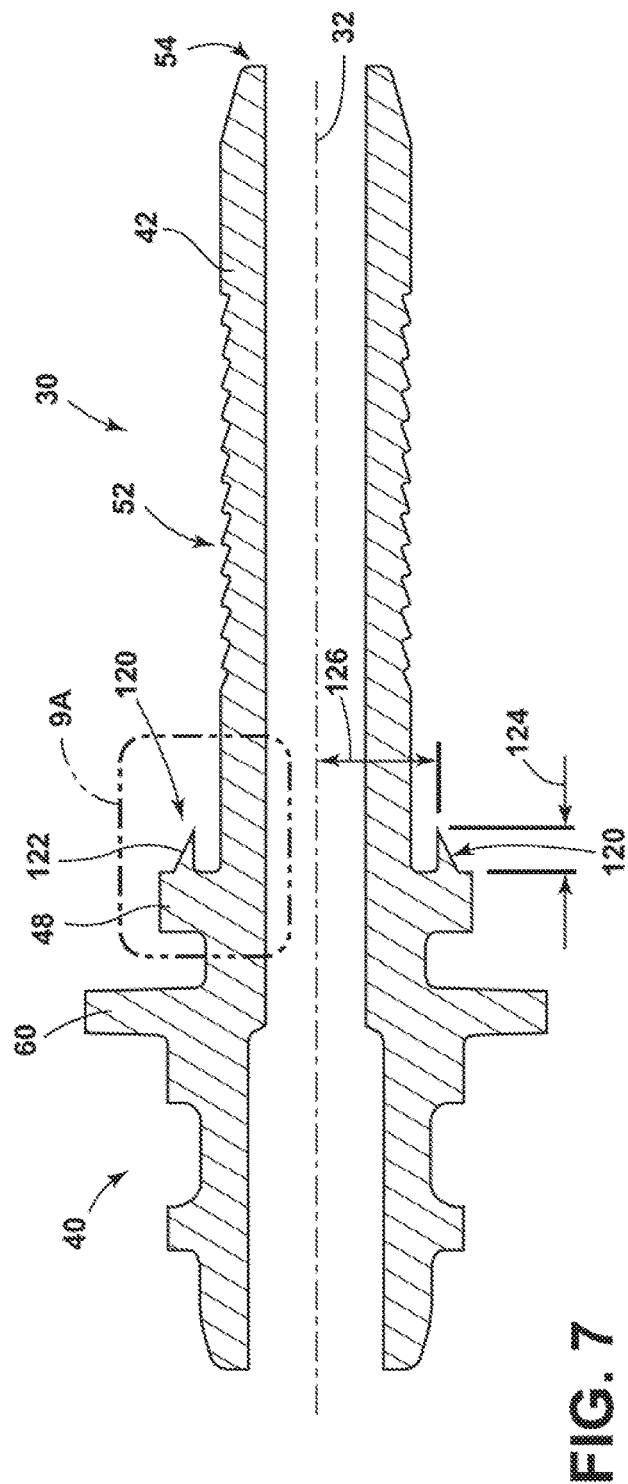
FIG. 7 is a cross-sectional view of an embodiment of a fitting with an axial protrusion in accordance with teachings of the present disclosure.
Figure 7A:
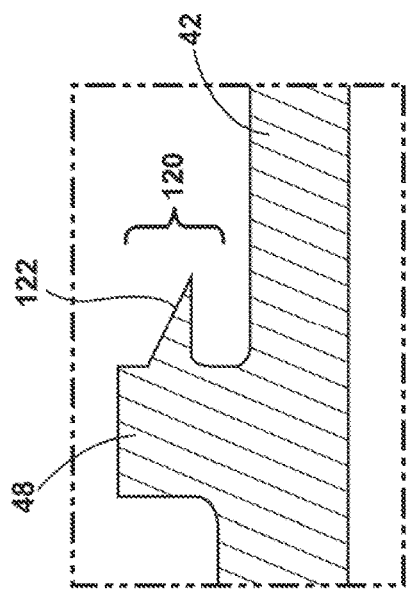
FIG. 7A is an enlarged cross-sectional view of the embodiment of an axial protrusion of FIG. 7.

In embodiments of the present disclosure, such as generally illustrated in FIGS. 4 and 5, a fitting 30 may include a central axis 32, a nipple 40, a socket 70, and/or a fluid conduit 80.

In embodiments, nipple 40 may include a fluid conduit connection portion 42 that may be configured for insertion into fluid conduit 80 (e.g., may include an outer diameter 44 that may be about the same as the inner diameter 82 of fluid conduit 80, slightly smaller than, or slightly larger than the inner diameter 82 of fluid conduit 80). Nipple 40 may be referred to herein as stem 40. Fitting 30 may include another fluid conduit connection portion 42' that may be disposed opposite fluid conduit connection portion 42 and may be configured for fluid communication with another fluid conduit 80'. The fluid conduit connection portions 42, 42' may be separated by a header 60. Header 60 may be generally annular and/or may extend radially outward. Header 60 may include an outer diameter 62 that is larger than the outer diameter 44 of the fluid conduit connection portions 42 and/or that may be at least as large as an inner diameter 74 of socket 70. Fluid conduit connection portion 42 may be referred to herein as connection portion 42.

In embodiments, nipple 40 may include a radial projection 48 (see, e.g., FIGS. 4, 7A, 7B, 8A, 8B, and 10). Radial projection 48 may cooperate with header 60 to define a recess 50 that may be configured for engagement with a flange 72 of socket 70. Flange 72 and recess 50 may help retain socket 70 relative to nipple 40. For example, and without limitation, socket 70 may slide (e.g., axially) over nipple 40 and/or fluid conduit 80 such that flange 72 may initially deflect over radial projection 48 and, upon further sliding, may engage recess 50 to at least partially retain socket 70 relative to nipple 40.

In embodiments, fluid conduit 80 may include one or more of a variety of shapes, sizes, configurations, and/or materials. For example, and without limitation, fluid conduit 80 may comprise a generally cylindrical shape, may not include any metals, and/or may include a polymer, para-aramid synthetic fiber (e.g., Kevlar®), and/or polytetrafluoroethylene (PTFE). In embodiments, fluid conduit 80 may be configured as a flexible tube and/or may be referred to herein as flexible tube 80. Fluid conduit 80 may comprise an inner core portion 86, which may be configured for conveying fluid from one location to another, and an outer reinforcement layer 88. A reinforcement layer 88 may be disposed around a segment of core portion 86 to provide additional strength to core portion 86 and/or to protect core portion 86 from damage.

In embodiments, socket 70 may be configured to at least partially surround (e.g., circumferentially) nipple 40 and/or fluid conduit 80. Socket 70 may include an inner diameter 74 that is at least as large or larger than an outer diameter 44 of connection portion 42 of nipple 40 and/or than the outer diameter 84 of fluid conduit 80. In embodiments, socket 70 may include one or more retaining features that may help retain socket 70 relative to fluid conduit 80 and/or retain fluid conduit 80 relative to nipple 40. For example, and without limitation, socket 70 may include one or more grooves 76 (e.g., circumferential grooves) that may be configured to increase friction between socket 70 and fluid conduit 80. In embodiments, socket 70 may include, for example, three adjacent grooves 76. In embodiments, socket 70 may be configured to be crimped to fluid conduit 80 and/or to nipple 40. For example, and without limitation, socket 70 may be sufficiently malleable to be crimped at or near grooves 76 such that edges 76A of the grooves 76 engage (e.g., dig into) the surface of fluid conduit 80 (e.g., reinforcement layer 88).

In embodiments, such as generally illustrated in FIGS. 5 and 6A-6C, nipple 40 may be configured for multi-stage crimping relative to fluid conduit 80. In certain designs (e.g., fittings 10A, 10B), a tube 14A, 14B may only be crimped to a nipple in a single area 26A, 26B (see, e.g., FIGS. 1 and 2). Multi-stage/area crimping may eliminate and/or reduce compression leaks (e.g., that may otherwise result from temperature and/or pressure cycles). Referring to FIG. 5, nipple 40 may include a sealing sleeve 140 (e.g., a circumferential sealing sleeve). Sealing sleeve 140 may be configured as a circumferential projection extending in the axial direction (e.g., relative to central axis 32). Sealing sleeve 140 may include an inner diameter 142 that is greater than the outer diameter 44 of connection portion 42 such that an axially-extending radial gap/recess 144 is formed between sealing sleeve 140 and connection portion 42. Gap 144 may be sufficiently large to permit at least a portion of fluid conduit 80 (e.g., core portion 86) to be inserted into gap 144. In embodiments, prior to inserting fluid conduit 80 and/or core portion 86 into gap 144, fluid conduit 80 may be skived and/or stripped to separate and/or cut away portions of reinforcement layer 88 from core portion 86 such that a section 86A of core portion 86 is exposed. The exposed/skived section 86A may then be inserted into gap 144.

In embodiments, sealing sleeve 140 may include one or more retaining features, such as grooves 146, that may increase friction between fluid conduit 80 and nipple 40. In embodiments, sealing sleeve 140 may be configured to be crimped (e.g., may be sufficiently malleable) such that core portion 86 of fluid conduit 80 is retained/trapped between sealing sleeve 140 and connection portion 42 to provide a fluid seal. The crimping may create a second crimping area 152. A first crimping area 150 may correspond to and/or result from crimping socket 70 to fluid conduit 80 and nipple 40 (e.g., connection portion 42). Crimping fitting 30 in first crimping area 150 and second crimping area 152 may correspond to fitting 30 including multi-stage crimping. The second crimping area 152 may reduce and/or eliminate fluid leaks between fluid conduit 80 and nipple 40, even after multiple temperature cycles and at high pressures. In embodiments, the first crimping area 150, which may include portions of socket 70, fluid conduit 80, and connection portion 42, may be configured to bear all axial loads applied to fitting 30, which may protect second crimping area 152 from experiencing any significant axial loads (e.g., may be substantially isolated from axial loads). Instead, in embodiments, second crimping area 152 may be configured solely to provide a fluid seal and may not be relied upon to provide any significant axial retention.

In embodiments, such as generally illustrated in FIGS. 4, 5, and 6A-6C, nipple 40 may include retaining features that may be configured in one or more of a variety of ways. For example, sealing sleeve 140 may include one or more grooves 146, connection portion 42 may include one or more grooves 52 that may be overlapped by sealing sleeve 140 in the radial direction, and/or connection portion 42 may include one or more grooves 52 that may not be overlapped radially by sealing sleeve 140 (e.g., may be axially spaced from sealing sleeve 140 and/or may be closer to an outer end 54 of nipple 40 than sealing sleeve 140). In embodiments, one or more of grooves 52 may, for example, include a saw-toothed shape.

In embodiments, such as generally illustrated in FIG. 5, connection portion 42 may include a tapered inner diameter 46 at or near outer end 54. For example, and without limitation, upon application of/in response to high pressure fluid to connection portion 42, the outer diameter 44 and/or the inner diameter 46 of connection portion 42 may increase at and/or near outer end 54 such that outer end 54 deflects outward and contacts the inner diameter 82 of fluid conduit 80, providing a fluid seal between nipple 40 and fluid conduit 80.

In embodiments, such as generally illustrated in FIGS. 7, 7A, 8A, and 8B, radial projection 48 may include an axial protrusion 120. Axial protrusion 120 may be configured as a tooth, a horizontal barb, and/or may include a triangular shape that may come to a point generally directed along the axial direction (e.g., parallel to central axis 32). Axial protrusion 120 may be configured to engage fluid conduit 80. For example, and without limitation, axial protrusion 120 may be configured to (e.g., may include an axial length 124 and/or radial height 126) protrude into an axial end 86B of core portion 86, such as generally illustrated in FIG. 8A. In other embodiments, axial protrusion 120 may be configured, for example, to protrude between core portion 86 and reinforcement layer 88, such as generally illustrated in FIG. 8B. If protrusion 120 protrudes between core portion 86 and reinforcement layer 88, protrusion 120 may effectively separate a portion of reinforcement layer 88 from core portion 86. In embodiments, axial protrusion 120 may be integrally formed with nipple 40 and/or radial projection 48. In other embodiments, radial projection 48 and axial protrusion 120 may be formed as a single component distinct from and connected to nipple 40. In other embodiments, radial projection 48 and axial protrusion 120 may each be formed as separate components. In embodiments, fitting 30 may be crimped and crimping may apply a force on as outer surface 122 of axial protrusion 120, which may cause axial protrusion 120 to deflect radially inward and may further improve the fluid seal of fitting 30 (e.g., axial protrusion 120 may effectively hook core portion 86). In embodiments, fitting 30 may include a plurality of axial protrusions 120 and/or an axial protrusion 120 may extend circumferentially around fitting 30.

Figure 9C:
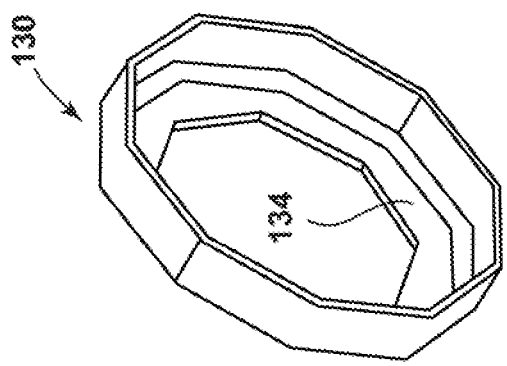
FIG. 9C is an isometric view of the embodiment of a tip for a fitting of FIG. 9A.
Figure 9B:
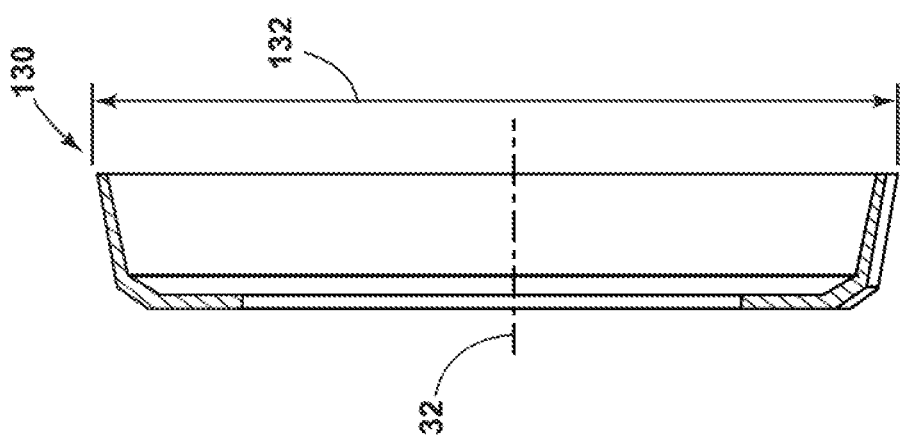
FIGS. 9A and 9B are side views of an embodiment of a tip for a fitting in accordance with teachings of the present disclosure.
Figure 9A:
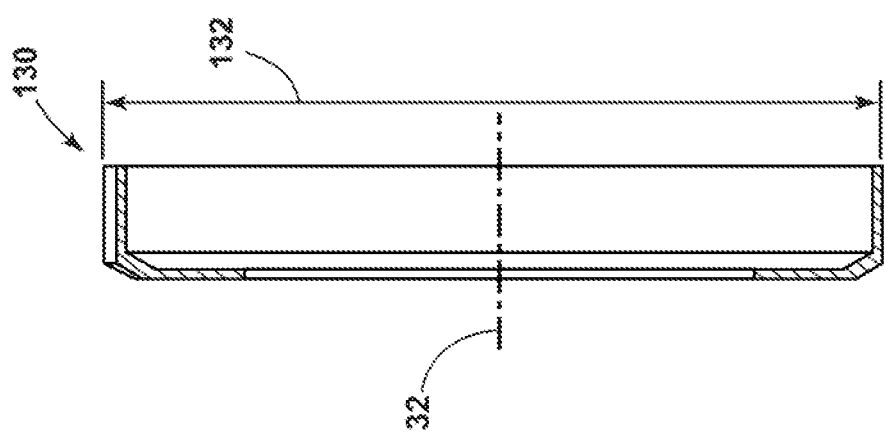
Figure 10:
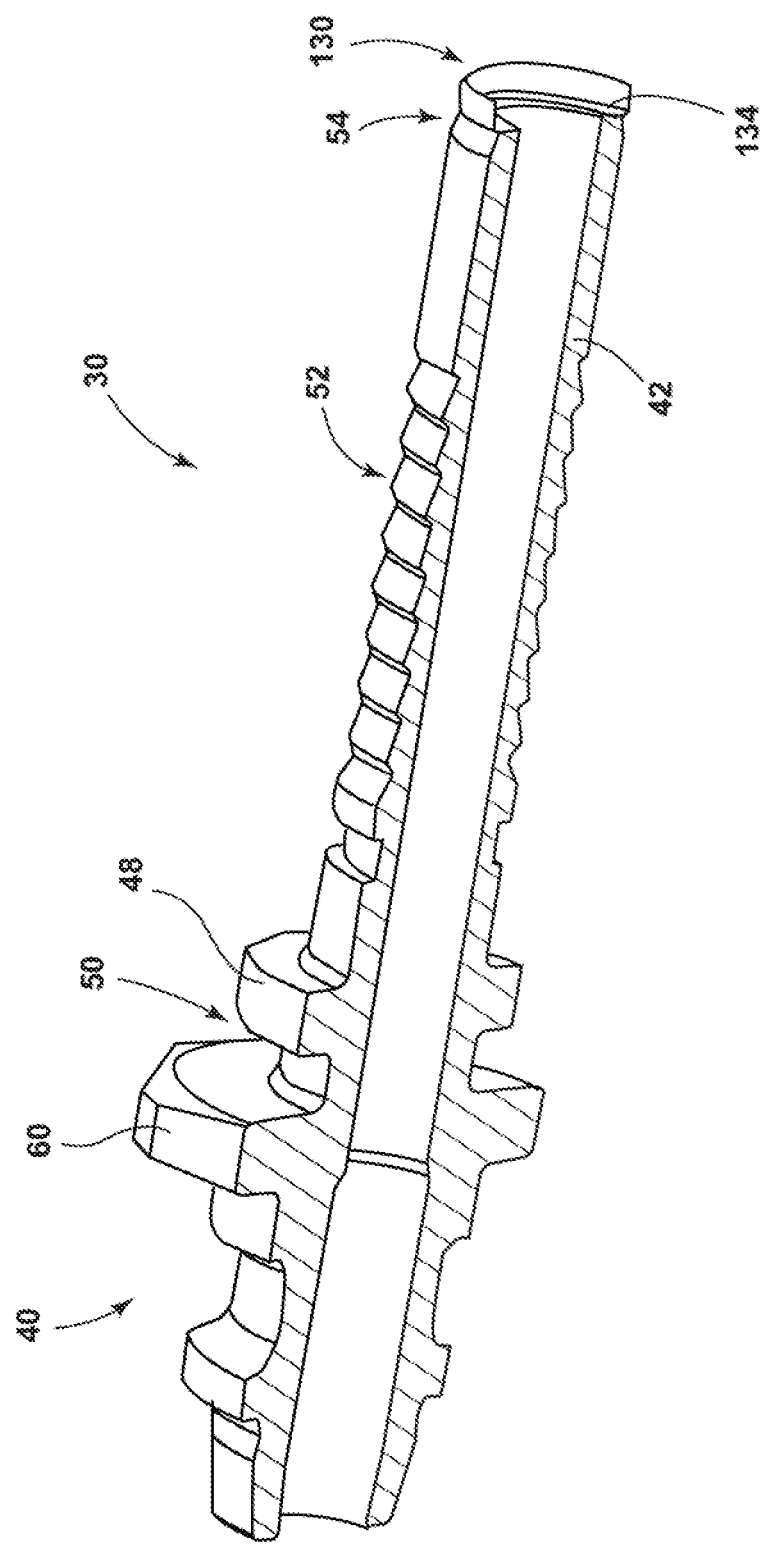
FIG. 10 is an isometric view of an embodiment of a fitting with a tip in accordance with teachings of the present disclosure.

In embodiments, such as generally illustrated in FIGS. 9A-9C and 10, a fitting 30 may include a dynamic tip 130. Tip 130 may be configured to be added to connection portion 42 at or near outer end 54 of nipple 40. As generally illustrated in FIG. 9A, tip 130 may include an outer diameter 132 (e.g., a first diameter) that may, at least initially, be about the same as or smaller than the outer diameter 44 of connection portion 42, which may allow for connection portion 42 and tip 130 to be inserted into fluid conduit 80 as if tip 130 was not present. As generally illustrated in FIG. 9B, if tip 130 is exposed to high pressures, tip 130 may be configured to expand such that outer diameter 132 increases (e.g., to a second diameter) to contact the inner diameter 82 of fluid conduit 80. Such expansion of tip 130 may permit tip 130 to remain in sealing contact with core portion 86 even if the inner diameter 82 of fluid conduit 80 has increased, such as due to an increase in temperature. Tip 130 may be sufficiently malleable and/or resilient such that the outer diameter 132 of tip 130 may decrease if fluid pressure decreases and/or if the inner diameter 82 of fluid conduit 80 decreases (e.g., if the temperature decreases). This malleability and/or resiliency may allow tip 130 to effectively act like a spring so that tip 130 is always in sealing contact with the inner diameter 82 of fluid conduit 80 regardless of changes in size of the inner diameter 82 of fluid conduit 80, which may reduce and/or eliminate fluid leaks between fluid conduit 80 and nipple 40. In embodiments, tip 130 may include a generally annular cross-sectional shape (e.g., viewed along central axis) and/or may include a polygonal cross-sectional shape (e.g., a hexagon, an octagon, a decagon, etc.). In embodiments, tip 130 may include a circumferential flange portion 134 that may be configured to be secured to nipple 40 (e.g., via welding) and/or may extend radially inward such that it includes a reduced inner diameter compared to the rest of tip 130.

In embodiments, a method of assembling a fitting 30 may include inserting a nipple 40 at least partially into a fluid conduit 80, such as inserting connection portion 42 at least partially inside a core portion 86 of a fluid conduit 80.

In embodiments, as connection portion 42 is being inserted into fluid conduit 80, an axial protrusion 120 may engage/protrude into fluid conduit 80. In embodiments, the axial protrusion 120 may protrude into an axial end 86B of core portion 86. In other embodiments, axial protrusion 120 may protrude between core portion 86 and reinforcement layer 88. Fluid conduit 80 may then be secured to nipple 40, such as via crimping a socket 70 over fluid conduit 80 and nipple 40. Crimping may exert forces on an outer surface 122 of the axial protrusion 120, which may cause the axial protrusion 120 to deflect radially inward and may provide an even more improved fluid seal (e.g., axial protrusion may effectively hook core portion 86).

In embodiments, prior to insertion of connection portion 42 into fluid conduit 80, a dynamic tip 130 may be secured (e.g., welded), to an end of connection portion 42. Then, tip 130 and connection portion 42 may be inserted into core portion 86. If tip 130 is exposed to higher pressures, an outer diameter 132 of tip 130 may expand and remain in contact with an inner diameter 82 of fluid conduit 80. Tip 130 may include sufficient resiliency and/or malleability to flex with changes in pressure and/or temperature such that tip 130 remains in sealing contact with core portion 86. In embodiments, tip 130 may include sufficient strength to withstand fluid pressures up to and/or exceeding 10,000 psi.

In embodiments, prior to completing insertion of connection portion 42 into core portion 86, fluid conduit 80 may be skived/stripped to separate and/or cut off a portion of reinforcement layer 88 from core portion 86 to expose an exposed section 86A. An exposed section 86A of core portion 86 may then be inserted in a gap 144 between connection portion 42 and a sealing sleeve 140 of the nipple 40. Core portion 86 may then be crimped (e.g., using a crimping tool) between the sealing sleeve 140 and the nipple 40 to provide a fluid seal between core portion 86 and nipple 40. Fluid conduit 80 may, additionally or alternatively, be secured to nipple 40 via crimping a socket 70 over fluid conduit 80 and/or connection portion 42 such that the fitting 30 includes at least two crimping areas/stages 150, 152. Crimped area 152 of the socket 70 over fluid conduit 80 and/or connection portion 42 may be configured to withstand all expected axial forces to maintain fluid conduit 80, nipple 40, and/or socket 70 in the same axial position relative to each other and/or such that the crimping area 150 (e.g., portions of sealing sleeve 140, core portion 86, and/or fluid conduit connection portion 42) may not experience any significant axial forces.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although only certain embodiments have been described above with a certain degree of particularity, those skilled in the art could make numerous alterations to the disclosed embodiments without departing from the scope of this disclosure. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "diameter" throughout the specification is used for illustrative purposes only and does not limit the corresponding embodiments to a circular configuration. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure as defined in the appended claims.

What is claimed is:

1. A fluid fitting, comprising; a first fluid conduit connection portion forming an axial protrusion that extends to an outermost longitudinal end, wherein the axial protrusion includes a first tapered surface extending from the outermost longitudinal end, a longitudinally extending surface extending from the first tapered surface, and a second tapered surface extending from the longitudinally extending surface; a second fluid conduit connection portion; a header disposed axially between the first fluid conduit connection portion and the second fluid conduit connection portion; a sealing sleeve forming an axially-extending recess including inner and outer diameters with respective inner and outer retaining features to opposingly engage corresponding inner and outer surfaces of a fluid conduit; a nipple with a radial projection connected to the nipple; and a socket; wherein the axial protrusion inwardly tapers to a pointed leading end that is configured to provide a seal by protruding into an axial end of a fluid conduit; and the axial protrusion includes a convexed arch surface extending from the second tapered surface and a second longitudinal surface extending from the convexed arch surface.

2. The fluid fitting of claim 1, wherein the sealing sleeve and the first fluid conduit connection portion define an axially-extending radial gap.

3. The fluid fitting of claim 2, wherein the axially-extending radial gap is configured to receive at least a portion of the fluid conduit.

4. The fluid fitting of claim 3, wherein the fluid conduit includes a skived section, and the axially-extending radial gap is configured to receive the skived section.

5. The fluid fitting of claim 1, wherein the first fluid conduit connection portion is configured for a first crimping and a second crimping.

6. The fluid fitting of claim 5, wherein the first crimping includes crimping of a fluid conduit between the socket and the first fluid conduit connection portion.

7. The fluid fitting of claim 5, wherein the first crimping substantially isolates the second crimping from axial loads.

8. The fluid fitting of claim 1, wherein the sealing sleeve includes a retaining feature that overlaps radially with a retaining feature of the first fluid conduit connection portion.

9. The fluid fitting of claim 1, wherein an outer end of the first fluid conduit connection portion includes a tapered inner diameter.

10. The fluid fitting of claim 1, wherein the sealing sleeve is integrally formed with the first fluid conduit connection portion, the second fluid conduit connection portion, and the header.

11. A fluid fitting, comprising: a nipple; a radial projection connected to the nipple; and an axial protrusion extending from the radial projection to an outermost longitudinal end, wherein the axial protrusion includes a first tapered surface extending from the outermost longitudinal end, a longitudinally extending surface extending from the first tapered surface, and a second tapered surface extending from the longitudinally extending surface; wherein the axial protrusion inwardly tapers to a pointed leading end that is configured to provide a seal by protruding into an axial end of a fluid conduit; and the axial protrusion includes a convexed arch surface extending from the second tapered surface and a second longitudinal surface extending from the convexed arch surface.

12. The fluid fitting of claim 11, wherein said axial end of said fluid conduit includes a core and a reinforcement layer.

13. The fluid fitting of claim 11, wherein the axial protrusion is configured to deflect inward during crimping to hook at least a portion of said fluid conduit.

14. The fluid fitting of claim 11, wherein the radial projection is integrally formed with the nipple.

15. The fluid fitting of claim 11, wherein the radial projection is integrally formed with the axial protrusion.

16. The fluid fitting of claim 11, wherein the radial projection and axial protrusion are integrally formed with the nipple.

17. The fluid fitting of claim 11, comprising a socket disposed at least partially around the axial protrusion.

18. The fluid fitting of claim 11, wherein the fluid conduit does not include any metal.

19. A fluid fitting, comprising: a fluid conduit connection portion forming an axial protrusion extending to an outermost longitudinal end, wherein the axial protrusion includes a first tapered surface extending from the outermost longitudinal end, a longitudinally extending surface extending from the first tapered surface, and a second tapered surface extending from the longitudinally extending surface; a nipple with a radial projection connected to the nipple; and a dynamic tip connected to an end of the fluid conduit connection portion; wherein the dynamic tip is configured to radially expand in response to an increase in fluid pressure; the axial protrusion inwardly tapers to a pointed leading end that is configured to provide a seal by protruding into an axial end of a fluid conduit; and the axial protrusion includes a convexed arch surface extending from the second tapered surface and a second longitudinal surface extending from the convexed arch surface.

20. The fluid fitting of claim 19, wherein the dynamic tip comprises a generally annular shape.

21. The fluid fitting of claim 19, wherein the dynamic tip comprises a polygonal shape.

22. The fluid fitting of claim 21, wherein the polygonal shape comprises a decagon.

23. The fluid fitting of claim 19, wherein the dynamic tip has a first diameter at a first fluid pressure and has a second diameter at a second fluid pressure.

\* \* \* \* \*